United States Patent
Detal et al.

(10) Patent No.: US 11,374,855 B2
(45) Date of Patent: Jun. 28, 2022

(54) MULTI-PATH ACCESS NETWORK

(71) Applicant: TESSARES SA, Louvain-la-Neuve (BE)

(72) Inventors: Gregory Detal, Thorembais-Saint-Trond (BE); Matthieu Baerts, Gesves (BE)

(73) Assignee: TESSARES SA, Louvain-la-Neuve (BE)

( * ) Notice: Subject to any disclaimer, the term of this patent is extended or adjusted under 35 U.S.C. 154(b) by 0 days.

(21) Appl. No.: 17/267,290

(22) PCT Filed: May 28, 2019

(86) PCT No.: PCT/EP2019/063767
§ 371 (c)(1),
(2) Date: Feb. 9, 2021

(87) PCT Pub. No.: WO2020/038618
PCT Pub. Date: Feb. 27, 2020

(65) Prior Publication Data
US 2021/0314254 A1 Oct. 7, 2021

(30) Foreign Application Priority Data
Aug. 22, 2018 (EP) .................................. 18190299

(51) Int. Cl.
*H04L 45/24* (2022.01)
*H04L 12/46* (2006.01)
(Continued)

(52) U.S. Cl.
CPC .......... *H04L 45/24* (2013.01); *H04L 12/4633* (2013.01); *H04L 45/04* (2013.01); *H04L 45/52* (2013.01)

(58) Field of Classification Search
None
See application file for complete search history.

(56) References Cited

U.S. PATENT DOCUMENTS

2005/0033888 A1 * 2/2005 Qi .................. G06F 3/0661
710/200

FOREIGN PATENT DOCUMENTS

| EP | 2882148 A1 | 6/2015 |
| EP | 3255845 A1 | 12/2017 |
| WO | 2018108590 A1 | 6/2018 |

OTHER PUBLICATIONS

Extended Search Report and Written Opinion from European Application No. EP18190299.0, dated Feb. 26, 2019.
(Continued)

*Primary Examiner* — Christine T Duong
(74) *Attorney, Agent, or Firm* — Workman Nydegger

(57) ABSTRACT

A method for providing multi-path network access to a client in a network includes, by a first circuitry; i) providing routing of packets between the network and a first access network; ii) providing forwarding of packets within the first communication network; iii) intercepting packets from the client node destined for a destination node outside the first communication network; iv) forwarding the intercepted packets to a multi-path agent within the first network; and by the multi-path agent: i) receiving the intercepted packets from the first routing circuitry; ii) transforming the intercepted packets to multi-path packets supporting a multi-path networking protocol; and iv) forwarding, the multi-path packets to the first and/or second routing circuitry for further routing.

16 Claims, 10 Drawing Sheets

(51) Int. Cl.
*H04L 45/02* (2022.01)
*H04L 45/52* (2022.01)

(56) References Cited

OTHER PUBLICATIONS

International Search Report and Written Opinion from PCT Application No. PCT/EP2019/063767, dated Jul. 26, 2019.

* cited by examiner

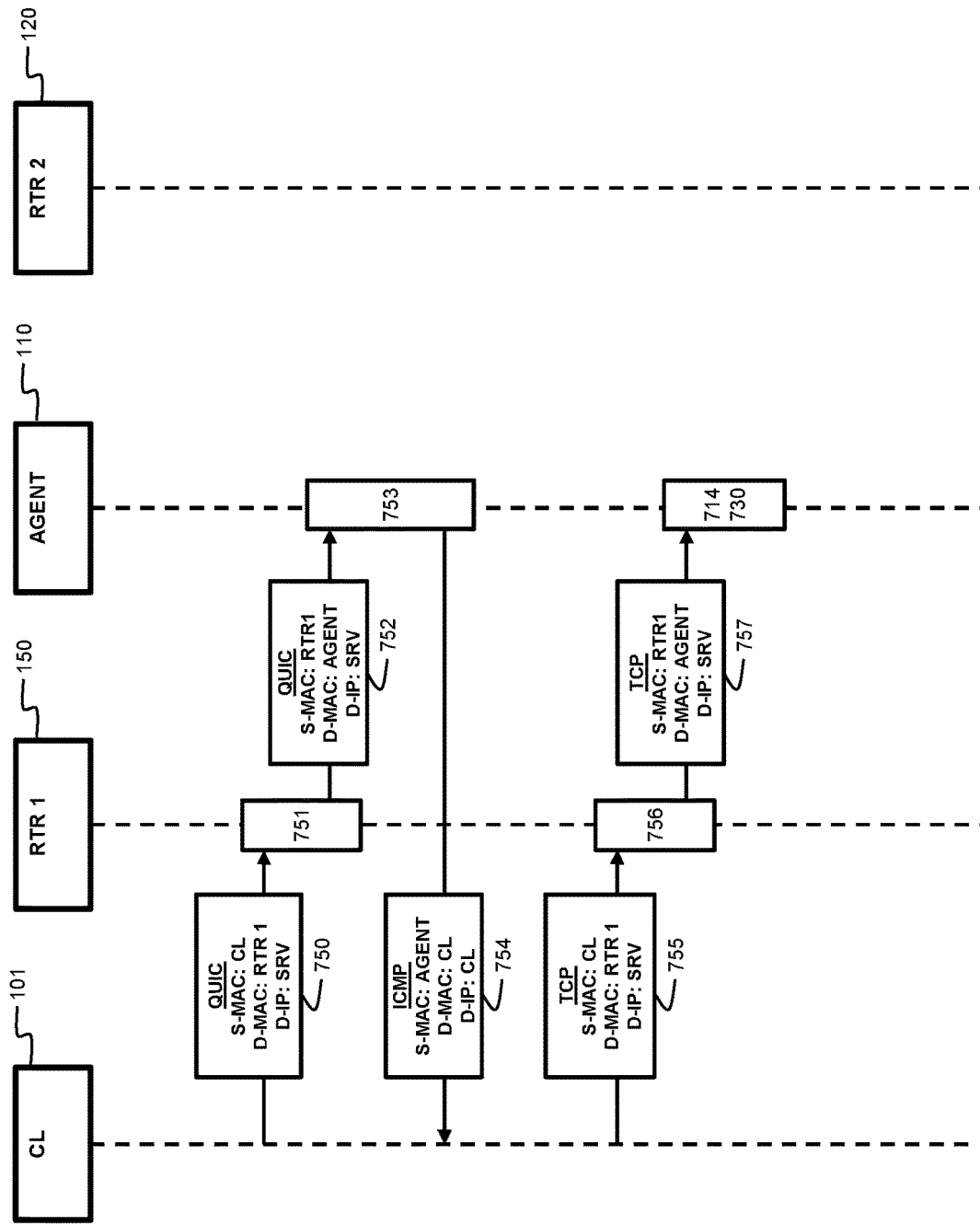

MULTI-PATH ACCESS NETWORK

FIELD OF THE INVENTION

The present invention generally relates to the provisioning of multi-path network access over different access networks, also referred to as hybrid network access.

BACKGROUND OF THE INVENTION

By an access network, a service provider allows a subscriber to connect its local network to a remote network. Typically, the remote network is a wide area network, a WAN, or the Internet. Such a local network may correspond to a private network using a private address space or it may share its address space with the remote network. A local network is also referred to as a local area network or LAN. Access to the access network is typically provided by a gateway router serving as a physical communication interface between the access network technology and the local area network technology. A gateway router further performs routing by forwarding packets from the local network to the remote network and vice versa. A gateway router may further also provide local packet forwarding on different layers of the networking stack.

The ever-increasing demand for bandwidth has lead to the introduction of hybrid access networks wherein a provider provides remote network access to a subscriber over different access networks, typically over different network access technologies. By the implementation of a multi-path proxying agent in the gateway router, clients in the local network may further be offered with the aggregated bandwidth of the different access networks in a transparent or semi-transparent manner.

EP2882148 discloses a solution wherein multi-path capabilities are provided by multi-path agents in both the gateway router and a remote gateway within the remote network. The multi-path agent in the gateway router then transform a single-path connection initiated by a client in the local network to a multi-path connection with either the remote gateway or the destination node by setting up multi-path subflows over the different access networks.

EP3255845 discloses a solution wherein multi-path capabilities are provided by multi-path agents in both the gateway router, referred to as a Hybrid Customer Premises Equipment or HCPE, and a hybrid access gateway or HAG within the provider's access network.

A service provider may upgrade a subscriber's existing access network connection to such a hybrid access network connection by the addition of a second gateway to the subscriber's local network thereby providing access to a second access network of the provider. Such a second gateway may come in many forms, e.g., as an internal or external addon module to the existing gateway router or as a separate network node which connects directly to the subscriber's local network. Furthermore, the multi-path agent may be integrated within the network stack of the subscriber's existing gateway router. This has the advantage that there is no need for replacing the gateway router.

However, the processing power of gateway routers is not always foreseen for running such a multi-path agent. Because of this, the overall network throughput may drop thereby losing the initial advantage of the aggregated bandwidth.

SUMMARY OF THE INVENTION

It is an object of the present invention to overcome the above disadvantage and to provide a solution for adding multi-path network access capabilities to an existing access network.

This object is achieved, according to a first aspect of the invention, by a computer-implemented method for providing multi-path network access to a client node in a first communication network, the method comprising, by a first routing circuitry:
  providing routing, of packets between the first communication network and a first access network thereby providing network access to the first communication network;
  providing forwarding of packets within the first communication network;
  intercepting network packets from the client node destined for a destination node outside the first communication network;
  forwarding the intercepted network packets to a multi-path agent within the first network;
the method further comprising, by the multi-path agent:
  receiving the intercepted network packets from the first routing circuitry;
  transforming the intercepted network packets to multi-path networking packets supporting a multi-path networking protocol; and
  forwarding, according to the multi-path networking protocol, the multi-path networking packets to the first routing circuitry for further routing along the first access network and/or to a second routing circuitry for further routing along a second access network; and wherein the second routing circuitry provides network access to the first communication network over the second access network.

In other words, multi-path network access is provided by an interoperating of a multi-path agent and two routing circuitries. A routing circuitry is to be understood as an addressable network component, i.e., at least addressable at the data link layer, for example by a Medium Access Controller, MAC, address. As the first routing circuitry is performing routing and forwarding, it may function as a component of a gateway router serving as both a switch within the first network and as a router between the first network and the first access network. Likewise, the second routing circuitry may function as a component of a second gateway router serving as a router between the first communication network and the second access network. Instead of having the multi-path agent implemented within this first circuitry, the networking packets are just intercepted and forwarded to the multi-path agent. As the packets are forwarded, the multi-path agent is thus also addressable by its own data link layer address.

The multi-path agent then performs the transformation to multi-path networking packets, e.g. a transformation of TCP/IP packets to multi-path enabled TCP packets wherein, by the forwarding, the multi-path enabled packets may be forwarded as part of a first sub-flow to the first routing circuitry and/or as part of a second sub-flow to the second routing circuitry.

As the first routing circuitry and, hence, a first gateway router is merely responsible for intercepting and forwarding the packets for multi-path transformation, the additional processing for enabling hybrid network access is limited. As the first routing circuitry already supports routing and forwarding, it is also equipped for performing the intercepting and forwarding operation for the multi-path. As the routing circuitry does not need to perform the transformation itself, there is no need to implement the multi-path agent on the first routing circuitry. Hence, the first routing circuitry must not maintain a stateful connection that comes with the multi-path protocol transformation. In other words, the most intensive processing part for enabling multi-path network access is off-loaded from the first routing circuitry allowing the reuse of existing hardware equipment for extending gateway routers to support hybrid network access.

According to an embodiment, the method further comprises, by the first routing circuitry, sending status information of the first access network to the multi-path agent. The multi-path agent may then further perform the forwarding based on the status information of the first access network.

In other words, the multi-path agent and first routing circuitry maintain a control channel for the exchange of information, e.g. status information on the status of the first access network. Such status information may for example relate to whether the first access network is up or down and/or relate to the capacity of the first access network. This allows the multi-path agent to balance the forwarding to the respective sub-flows based on the actual performance of the access networks. The control channel for exchanging status information may for be established by a discovery procedure initiated by the multi-path agent, the first routing circuitry, or both.

Before the intercepting, the first routing circuitry may further route the network packets to the first access network by default, i.e., no intercepting is enabled. This way, hybrid network access may be enabled only when appropriate.

To perform such enabling, the multi-path agent may send to the first routing circuitry an instruction to start the intercepting. In other words, the decision to enable hybrid network access is taken by the multi-path agent which may enable and thus also disable hybrid network access at any desired moment in time. Such instruction may further be based on the status information supplied by the first routing circuitry and/or based on status information supplied by the second routing circuitry.

According to an embodiment, the status information comprises a bandwidth usage of the first access network; and wherein the sending the instruction by the multi-path agent is performed when the bandwidth usage exceeds a first bandwidth usage threshold; and wherein the method further comprises, by the multi-path agent, sending to the first routing circuitry an instruction to stop the intercepting when the bandwidth usage drops below a second bandwidth usage threshold; and wherein the second bandwidth usage threshold is smaller than or equal to the first bandwidth usage threshold.

It is thus an advantage that hybrid network access is only enabled when there is a shortage in throughput capacity in the first access network, i.e. when the bandwidth usage is too high according to the first bandwidth usage threshold. By using the second bandwidth usage threshold a constant toggling or oscillating between the different modes is avoided.

According to an embodiment, the method further comprises, upon detecting a predefined condition, redirecting all outside network traffic from the first routing circuitry to the second routing circuitry for further routing to the second access network.

As all outside network traffic is now rerouted, the second access network becomes the only available access network for outside network traffic. In other words, by the redirecting of all network traffic, a failover from the first to the second access network may be performed. After resolving the predefined condition, a failback to the original situation may be performed.

According to an embodiment, the intercepting by the first routing circuitry further comprises:
   inspecting if packets from the client node to the destination node comply with a predefined network protocol type, with a predefined transport protocol type, and/or with a predefined application protocol type; and
   when the inspected packets comply, performing the forwarding to the multi-path agent.

In other words, not all packets are relayed to the multi-path agent by default, but only a selection of the packets that comply with a predefined protocol type. This way, only packets that may useful for the multi-path transformation by the agent may be relayed thereby avoiding unnecessary delay and network traffic.

According to an embodiment, the method further comprises, by the multi-path agent, upon receiving an intercepted network packet according to a protocol that does not allow multi-path transformation by the multi-path agent; sending a message to the client node for forcing the client to fall back to another protocol that is supported by the multi-path agent for multi-path transformation.

Some communication protocols allow to fall back to other protocols. Such fall back may often be triggered by sending a message to the source node. Upon triggering, the source node will then fall back to the other communication protocol. It is thus an advantage that a network connection between the client and server that is not supported by the multi-path agent for multi-path transformation may still be changed to a supported protocol thereby profiting from the hybrid network access.

According to an embodiment, the method further comprises, by the multi-path agent:
   deciding to perform the transforming based on a white or black list comprising criteria for respectively allowing or refusing the transforming.

According to embodiments of the invention, the method further comprises steps performed by the first and second networking circuitry and by the multi-path agent for providing a return path between the server and the client. To this end, the method further comprises:
   by the first and/or second routing circuitry, receiving in return a multi-path networking packet from the respective first and/or second access network, and forwarding the multi-path networking packet to the multi-path agent;
   by the multi-path agent, receiving the forwarded multi-path networking packet, and transforming the multi-path networking packets to a protocol supported by the client, and forwarding the transformed networking packet to the client.

According to further aspects of the invention networking components are disclosed that are configured to perform various steps according to the various methods of the first aspect.

To this respect, according to a second aspect, the invention relates to a gateway router comprising a routing circuitry configured to perform the following steps:
   providing routing, of packets between a first communication network and a first access network thereby providing network access to the first communication network;
   providing forwarding of packets within the first communication network;

intercepting network packets from a client node destined for a destination node outside the first communication network;

forwarding the intercepted network packets to a multi-path agent within the first network;

receiving from the multi-path agent a selection of the intercepted network packets transformed according to a multi-path networking protocol;

forwarding the transformed network packets to the destination node over the first access network.

According to an embodiment, the gateway router may further comprise multi-path routing circuitry configured to perform the following steps:

receiving the intercepted network packets from the first routing circuitry;

transforming the intercepted network packets to multi-path networking packets according to the multi-path networking protocol; and forwarding, according to the multi-path networking protocol, the multi-path networking packets to the first routing circuitry for further routing along the first access network and/or to a second routing circuitry for further routing along a second access network; wherein the second routing circuitry provides network access to the first communication network over the second access network.

The gateway router may further comprise this second routing circuitry.

According to a third aspect, a networking device is disclosed comprising a communication interface and routing circuitry configured to perform the following steps receiving intercepted network packets from a gateway router;

transforming the intercepted network packets to multi-path networking packets according to a multi-path networking protocol; and forwarding, according to the multi-path networking protocol, the multi-path networking packets to the gateway router for further routing along the first access network and/or to a second routing circuitry for further routing along a second access network; wherein the second routing circuitry provides network access to the first communication network over a second access network.

According to an embodiment, the communication interface is a wireless communication interface connectable to the gateway router by a wireless local area network. The networking device then further comprises the second routing circuitry and a second wireless communication interface for providing the networking device network access to the second access network. The networking device is further configured to establish a networking tunnel between the multipath circuitry and the gateway for exchanging the networking packets with the gateway router.

In this case, the networking device may be a mobile device such as a smartphone that can be configured to perform the tasks of the multi-path agent and to provide the access to the second access network. In other words, a mobile device may be used to extend the bandwidth of local area network that is connected with a single access network. This may further be done without any hardware changes to the existing gateway.

BRIEF DESCRIPTION OF THE DRAWINGS

FIGS. 7A, 7B and 7C illustrate steps performed by a first routing circuitry, by a second routing circuitry, by a multi-path agent and by a client connected to the first routing circuitry according to an embodiment.

DETAILED DESCRIPTION OF EMBODIMENT(S)

Figure 1:
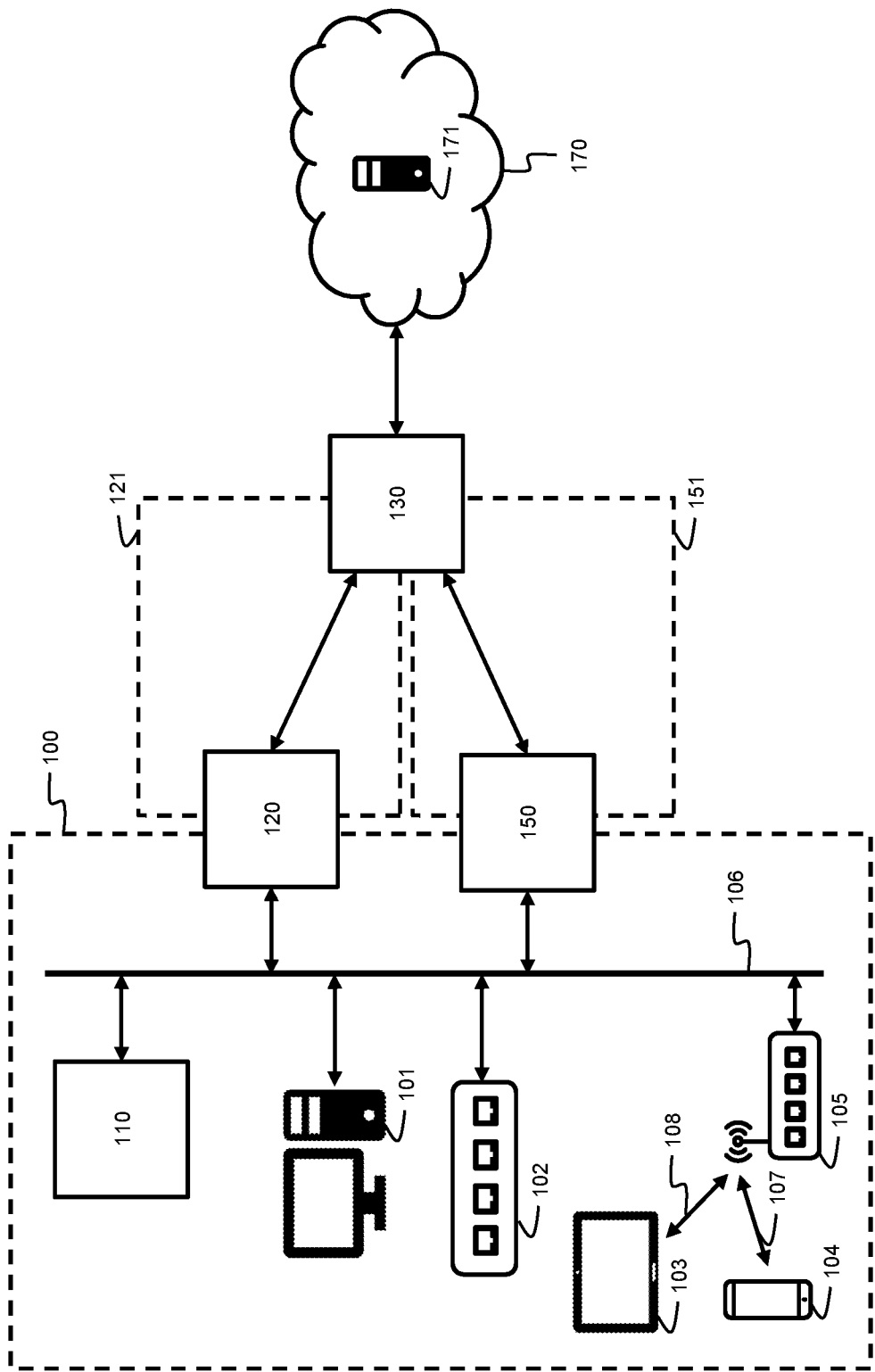
FIG. 1 illustrates, according to an embodiment, a local area network connected to a remote network by a first routing circuitry connecting the local area network to a first access network and by a second routing circuitry connecting the local area network to a second access network; the local area network further comprising a multi-path agent.

The present invention relates to the provisioning of hybrid network access. By an access network, a service provider may connect a subscriber's local area network to a remote network such as a wide area network, WAN, or the Internet. The main working principle of a hybrid access network according to an embodiment is illustrated in FIG. 1. A subscriber's communication network, also referred to as a local area network or LAN, is illustrated by the dashed rectangle 100. The LAN 100 may comprise different network components 110, 120, 150 or network devices 101-105 connected to each other, either by wire (104) or wirelessly (107, 108). Network devices may comprise end nodes 101, 103, 104 serving primarily as source or destination node. Examples of end nodes are a desktop computer 101, a tablet 103 and smartphone 104. Network devices also comprise intermediate devices such as for example a wireless access point 105 for providing a wireless connection to the LAN, or switches 102, 105 for providing star-like connectivity to the LAN. Switches typically comprise logic for forwarding packets along its different ports. Such switching logic may further operate along different layers of the networking protocol stack.

The LAN further comprises at least two gateway routers having respective routing circuitry 120, 150 for respectively connecting the LAN 100 with the two access networks 121,

151 by routing networking packets between the LAN 100 and the respective access networks 121, 151. A gateway router with routing circuitry 120, 150 may connect to respective access networks 121, 151 by a wired communication technology such as by a Digital Subscriber Line, DSL, communication technology, by a cable communication technology or by an optical fibre technology. A gateway router with routing circuitry 120, 150 may also connect to respective access networks 121, 151 by a wireless communication technology, for example by a cellular communication technology, e.g. any technology according to the Long-Term Evolution, LTE, standard as developed by the 3rd Generation Partnership Project, 3GPP. Embodiments of the invention are particularly useful when combining such a wired access technology with a wireless access technology.

Figure 3:
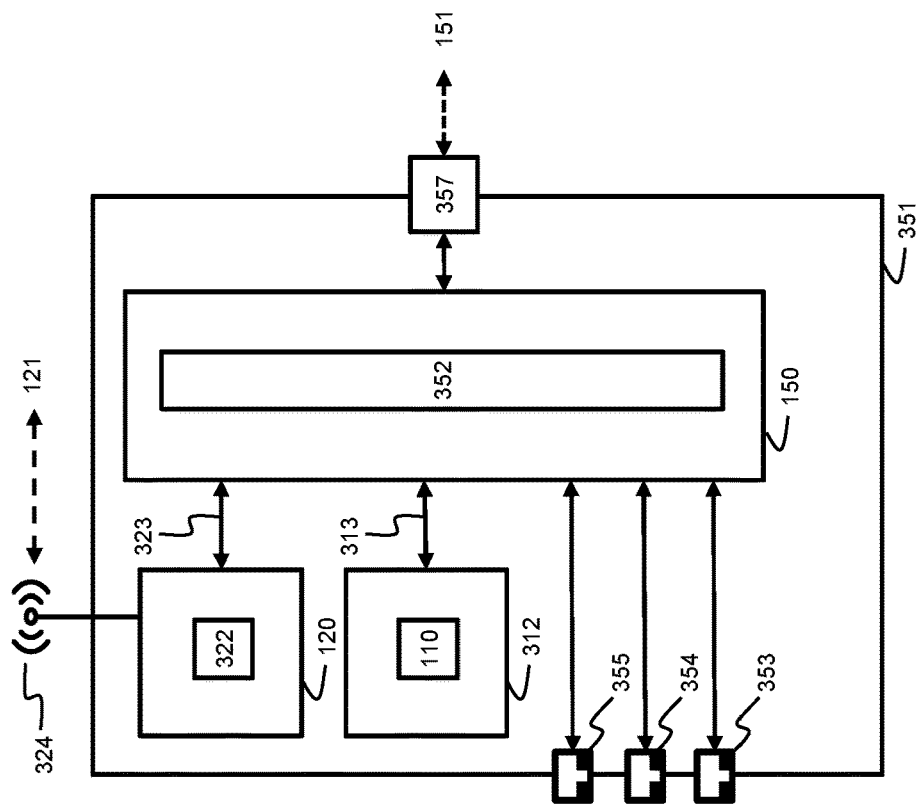
FIG. 3 illustrates, according to an embodiment, a first gateway router comprising first routing circuitry, second routing circuitry and a multipath agent.
Figure 2:
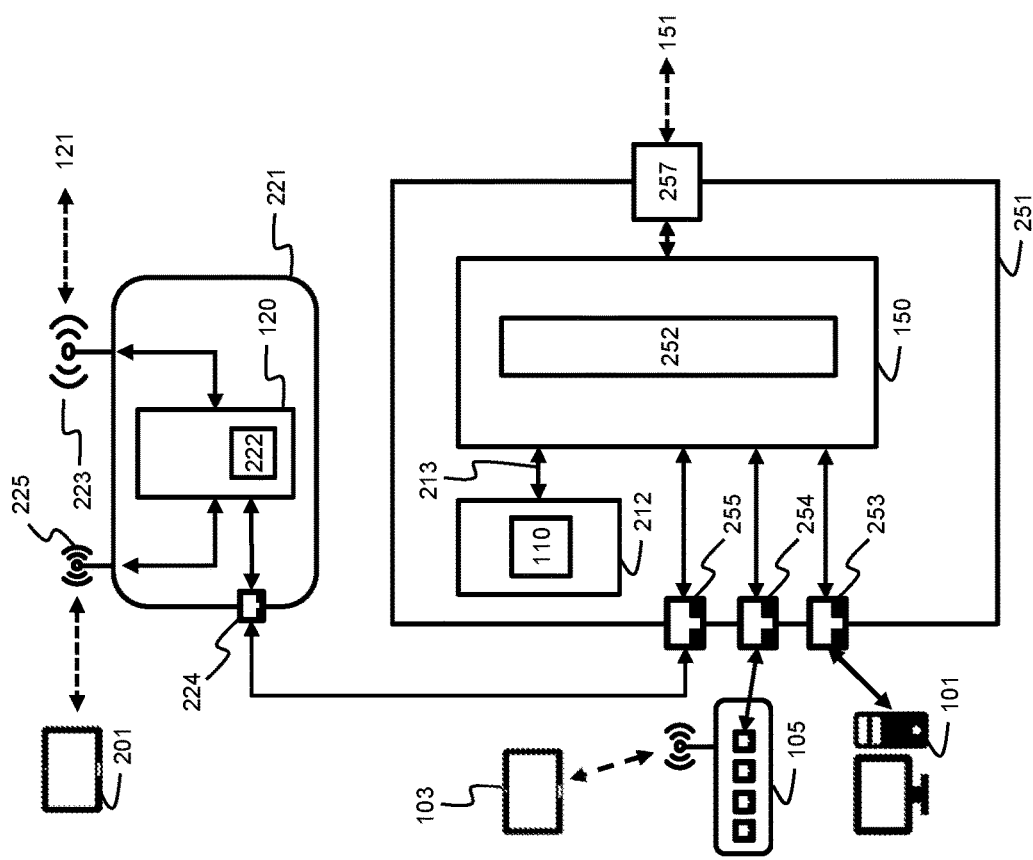
FIG. 2 illustrates, according to an embodiment, a first gateway router comprising first routing circuitry and a network agent, and a second gateway router comprising second routing circuitry.
Figure 4:
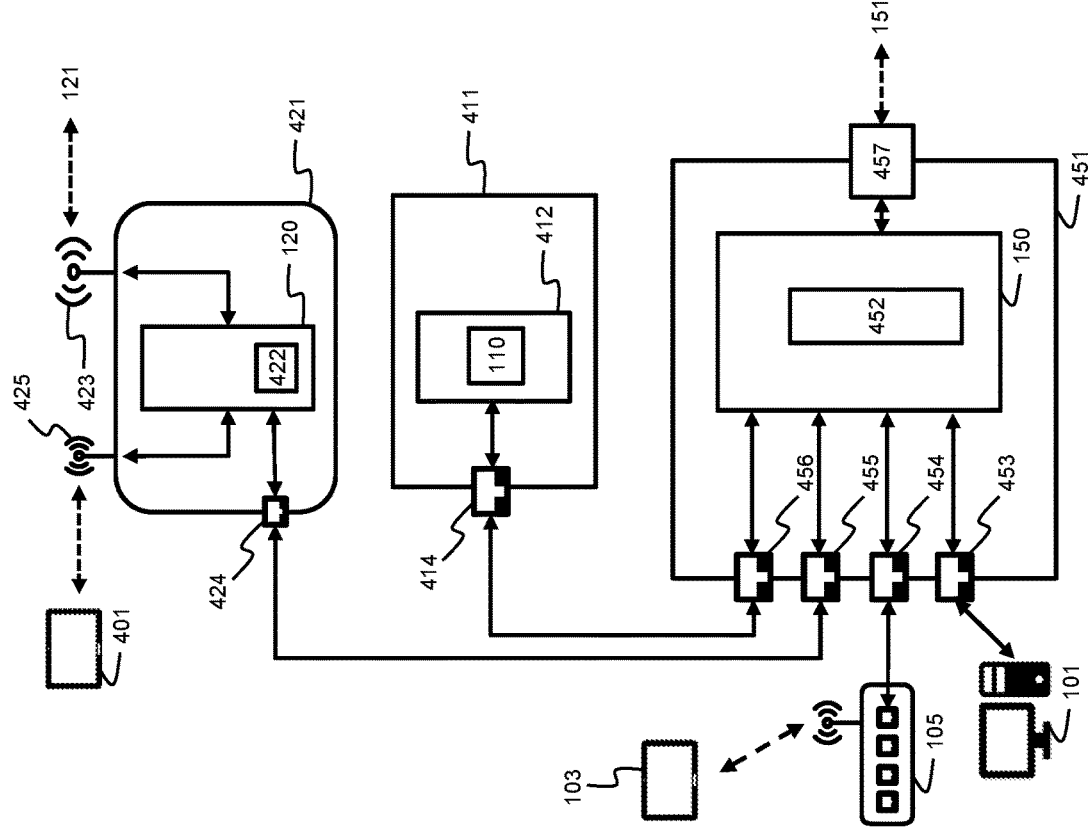
FIG. 4 illustrates, according to an embodiment, a first gateway router comprising first routing circuitry, a second gateway router comprising second routing circuitry and a networking device comprising a multipath agent.

By the access networks 121, 151, the LAN 100 is connectable to another remote network 170 and to network end nodes 171 within this remote network 170. Routing circuitries 120, 150 further interoperate with a third networking component 110 to provide the hybrid network access to the LAN 100 in a seamless and transparent manner. Networking component 110 is also referred to as multi-path agent 110 in the remainder of this description. FIGS. 2, 3 and 4 illustrate different arrangements of the first and second routing circuitries and the multi-path agent 110.

FIG. 2 illustrates a gateway router 251 comprising the first routing circuitry 150, and a second gateway router 221 comprising the second routing circuitry 120 according to a first embodiment. Gateway router 251 further comprises a wired communication interface 257 connectable to the first access network 151. Gateway router 251 may further comprise one or more wired communication interfaces 253, 254, 255 connectable to the LAN 100. A client 101 may then be directly connected to gateway router 251. The communication interfaces may also connect to a switch or wireless access point 105 to further connect to a client 103. Routing circuitry is further configured to perform different networking functions illustrated by box 252. These networking functions comprise a routing function for routing packets from the LAN 100 to the first access network 151 and vice versa; and a forwarding function for switching packets across the different connections within the LAN 100. Gateway router 251 further comprises an internal networking interface 213 connected to an internal control circuitry 212. This way, control circuitry is an addressable network component of the LAN 100. The control circuitry 212 is further configured to perform the steps of the multi-path agent 100 as will be further explained below. Control circuitry 212 may be embodied as an extension board of gateway router 251, for example by implementing it on a separate PCB that may be piggy bagged onto the other logic of gateway router 251.

FIG. 2 further illustrates a second gateway router 221 comprising a first wireless interface 223 connectable to the second access network 121 and a wired interface 224 connected to the LAN 100. Both interfaces 221, 224 are connected to routing circuitry 120. Routing circuitry 120 is further configured to perform routing functions between the two interfaces 221 and 224 as shown by the box 222. The second gateway router 221 may further comprise a second wireless interface 225 connected to the second routing circuitry 120. By the wireless interface 225, routing gateway 221 may further operate as a wireless access point. This way, LAN 100 may be extended wirelessly. A wireless client 201 may then connect to the wireless interface 225 and further, by the second routing circuitry 120, to the LAN 100.

By the arrangement of the multi-path agent 110 and the first and second routing circuitries 120, 150 in the gateway routers 251 and 221 according to FIG. 2, these components are connectable to the LAN 100 as schematically shown in FIG. 1.

FIG. 3 illustrates a gateway router 351 comprising the first routing circuitry 150 according to a second embodiment. Gateway router 351 further comprises a wired communication interface 357 connectable to the first access network 151. Gateway router 351 may further comprise one or more wired communication interfaces 353, 354, 355 connectable to the LAN 100 in an analogous way as shown in FIG. 2. Routing circuitry 150 is further configured to perform different networking functions illustrated by box 352. These networking functions comprise a routing function for routing packets from the LAN 100 to the first access network 151 and vice versa; and a forwarding function for switching packets across the different connections with the LAN 100. Gateway router 351 further comprises a first internal networking interface 313 connected to an internal control circuitry 312. This way, control circuitry 312 is an addressable network component of the LAN 100. The control circuitry 312 is further configured to perform the steps of the multi-path agent 110 as will be further described below. Control circuitry 312 may be embodied as an extension board of gateway router 351, for example by implementing it on a separate PCB that may be piggy bagged onto the other logic of gateway router 351. Gateway router 351 further comprises a second internal networking interface 323 connected to the second routing circuitry 120. This way, second routing circuitry 120 is an addressable network component of the LAN 100. The second routing circuitry is further connected to a wireless interface 324 connectable to the second access network 121. Routing circuitry 120 is further configured to perform routing functions between the two interfaces 324 and 323 as shown by the box 322.

By the arrangement of the multi-path agent 110 and the first and second routing circuitries 120, 150 in the gateway router 351 according to FIG. 3, these components may again be connected to the LAN 100 as schematically shown in FIG. 1.

FIG. 4 illustrates a gateway router 451 comprising the first routing circuitry 150, a network device 411 comprising the multi-path agent 110 and a second gateway router 421 comprising the second routing circuitry 120 according to a third embodiment. Gateway router 451 further comprises a wired communication interface 457 connectable to the first access network 151. Gateway router 451 may further comprise one or more wired communication interfaces 453 to 456 connectable to the LAN 100 in an analogous way as shown in FIG. 2. Routing circuitry 150 is further configured to perform different networking functions illustrated by box 452. These networking functions 452 comprise a routing function for routing packets from the LAN 100 to the first access network 151 and vice versa; and a forwarding function for switching packets across the different connections with the LAN 100.

Gateway router 451 is further connectable over the LAN 100 to a multi-path networking device 411 further comprises a networking interface 414 connected to an internal control circuitry 412. This way, control circuitry 412 is an addressable network component of the LAN 100. The control circuitry 412 is further configured to perform the steps of the multi-path agent 110 as will be further explained below. Networking device 411 is thus a separate device.

Gateway router 451 and networking device 411 are further connectable to a second gateway router 421 comprising a first wireless interface 423 connectable to the second access network 121 and a wired interface 424 connected to the LAN 100. Both interfaces 421, 424 are connected to routing circuitry 120. Routing circuitry 120 is further configured to perform routing functions between the two interfaces 421 and 424 as shown by the box 422. The second gateway router 421 may further comprise a second wireless interface 425 connected to the second routing circuitry 120. By the wireless interface 425, routing gateway 421 may further operate as a wireless access point. This way, LAN 100 may be extended wirelessly. This way, a wireless client 401 may connect to the wireless interface 425 and, by the routing circuitry 120, to the LAN 100.

By the arrangement of the multi-path agent 110 and the first and second routing circuitries 120, 150 in respectively the multi-path device 411 and gateway routers 451, 412 according to FIG. 4, these components may again be schematically represented as connected to the LAN 100 as schematically shown in FIG. 1.

Figure 5:
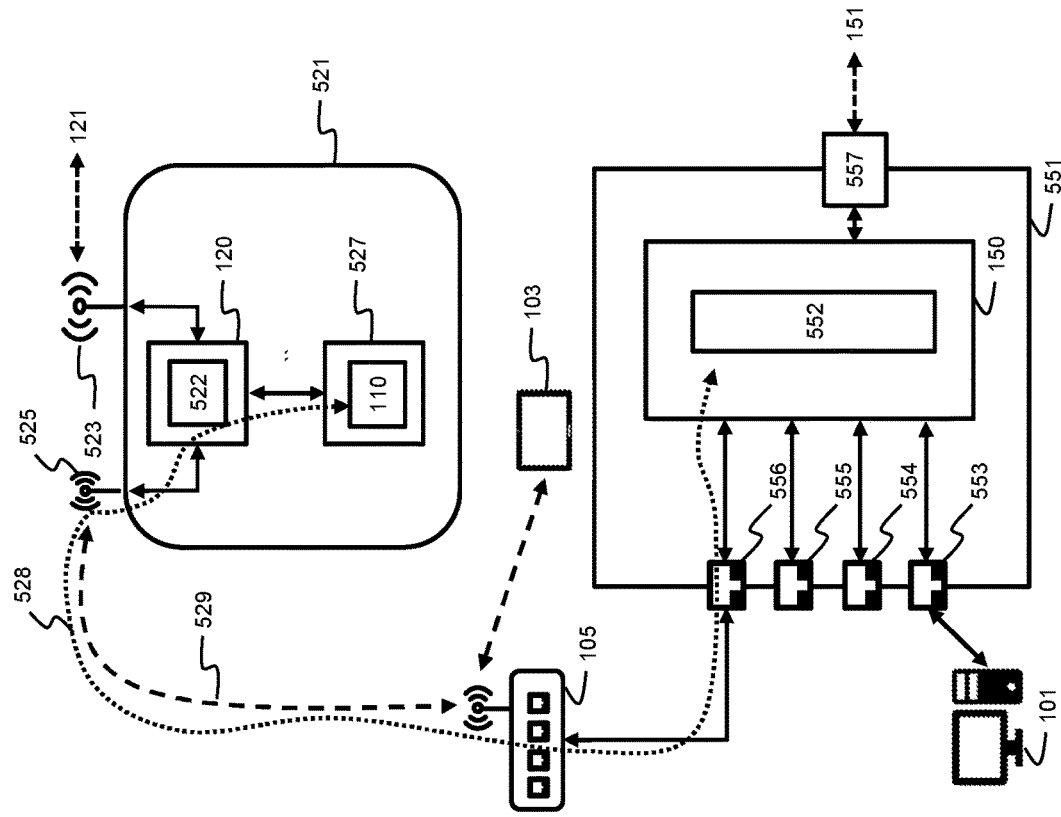
FIG. 5 illustrates, according to an embodiment, a first gateway router comprising a first routing circuitry and a mobile communication device comprising a second routing circuitry and a multipath agent.

FIG. 5 illustrates a gateway router 551 comprising the first routing circuitry 150, a mobile communication device 521 comprising the multi-path agent 110 and the second routing circuitry 120 according to a fourth embodiment. Gateway router 551 further comprises a wired communication interface 557 connectable to the first access network 151. Gateway router 551 may further comprise one or more wired communication interfaces 553 to 556 connectable to the LAN 100 in an analogous way as shown in FIG. 2. Routing circuitry 150 is further configured to perform different networking functions illustrated by box 552. These networking functions 552 comprise a routing function for routing packets from the LAN 100 to the first access network 151 and vice versa; and a forwarding function for switching packets across the different connections 553-556 with the LAN 100.

Gateway router 551 is further connectable to the communication device 521 over a wireless connection 529. This wireless connection is established between the wireless access point 105 and the wireless interface 525 of the communication device, e.g. by a wireless connection according to the IEEE 802.11 protocols. Access point 105 may also be incorporated within gateway router 551. The mobile communication device 521 further comprises a second wireless interface 523 connectable to the second access network 121. The device 521 also comprises the routing circuitry 120 configured to perform routing functions between the two interfaces 523 and 525 or to direct packets to applications 527 running on the mobile communication device. The functions performed by routing circuitry 120 are visualized by the box 522. The multi-path agent 110 runs as an application or service on the mobile communication device 521 and is presented as an addressable connection to gateway 551, i.e. to the first routing circuitry 150. To this respect, a network tunnel is established between gateway 551 and the mobile communication device 512 as illustrated by the dotted line 528 such that the multi-path agent becomes a virtual network addressable circuitry 527 for gateway 551.

By the arrangement of the multi-path agent 110 and the first and second routing circuitries 120, 150 in the mobile device 521 and gateway routers 551 according to FIG. 5, these components 110, 120, 150 may again be schematically represented as addressable from the LAN 100 as schematically shown in FIG. 1.

The mobile device 521 may be any device that comprises two wireless network interfaces, one (523) to connect to the LAN 100 and the other (523) to connect to the access network 121. Mobile device 521 may for example correspond to a smartphone, a tablet or laptop computer. Communication device 521 is further configured as a wireless client to the access point 105. This way, it does not serve nor is it configured as an access point. Therefore, during the steps as described further below, the client can still establish or maintain other data connections with other networking nodes in both the LAN 100 and network 121. To this respect, multi-path agent 110 may run as a service within the kernel space of the operating system of the mobile communication device 521. Alternatively, multi-path agent 110 may run as an application within the user space of the operating system of the mobile communication device 521. One way to establish a user-space application while reserving connectivity of both interfaces 523, 525 for other applications is described in EP3337121A1.

Figure 6:
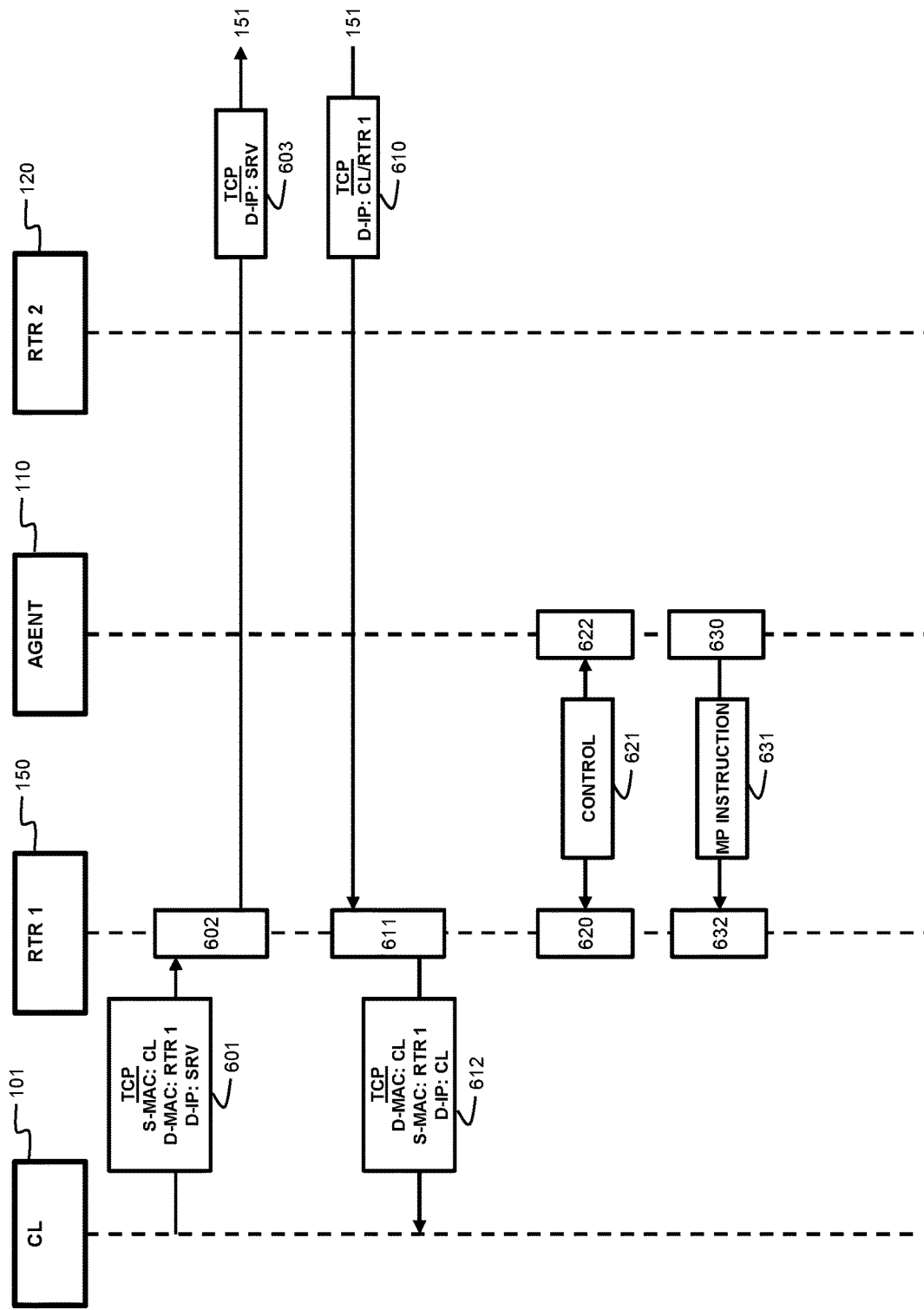
FIG. 6 illustrates steps performed by a first routing circuitry, by a second routing circuitry, by a multi-path agent and by a client connected to the first routing circuitry according to an embodiment.

FIG. 6 illustrates steps performed by routing circuitry 150, the multi-path agent 110 and the routing circuitry 120 according to an embodiment. FIG. 6 illustrates an initial situation wherein a client node 101 is solely provided network access over the first access network 151. At a certain moment in time, client 101 initiates the transmission of a network packet to a remote node 171 in a remote network outside LAN 100. Client 101 is configured to use the first routing circuitry 150 as a gateway. To this purpose, client 101 send the network packet 600 having as network destination address the address of the remote node 171 (D-IP: SRV) by encapsulating it in a data link layer frame 601 with the routing circuitry 150 as data link layer destination address (D-MAC: RTR 1). Upon arrival, the routing circuitry 150 performs its routing function 602 by forwarding the network packet as packet 603 along the first access network 151 to the remote node 171.

Analogously, when a network packet 610 destined for the client 101 (D-IP: CL/RTR 1) arrives from the remote node 171 at the routing circuitry 150, the routing circuitry 150 performs its routing function 611 in the reverse way by forwarding the packet as a data link layer frame 612 to the client 101. The above steps illustrate a first operation mode of the routing circuitry 150 in which the second access network is not utilized.

During this first operating mode, a control channel may be established between the routing circuitry 150 and the multi-path agent 110. The connection of the control channel may for example be established by a discovery procedure initiated by the multi-path agent 110, by routing circuitry 150, or by both. Referring to the embodiment of FIG. 5, the discovery procedure may further comprise the establishment of the networking tunnel 528 between mobile device 521 and gateway 551. This control channel may be used to exchange status information or control messages 621. Routing circuitry 150 may for example periodically send, according to step 620, status information about the first access network to the multi-path agent 110. Upon receival, according to step 622, the multi-path agent 110 may then use this status information to take any sort of action. The status information may for example comprise information on whether the first access network is operable or not or may comprise information on the bandwidth usage of the first access network. If the bandwidth usage of the first access network is too high, the multi-path agent 110 may decide (630) to also use the second access network for providing network access to LAN 100. To this end, multi-path agent 110 sends an instruction 631 to routing circuitry 150 to switch from the first operation mode to a second operation mode, i.e. a multi-path operation mode. Similarly, multi-path agent 110 may also send an instruction to routing circuitry 150 to stop the multi-path operation mode and switch back to the first operation mode.

Figure 10:
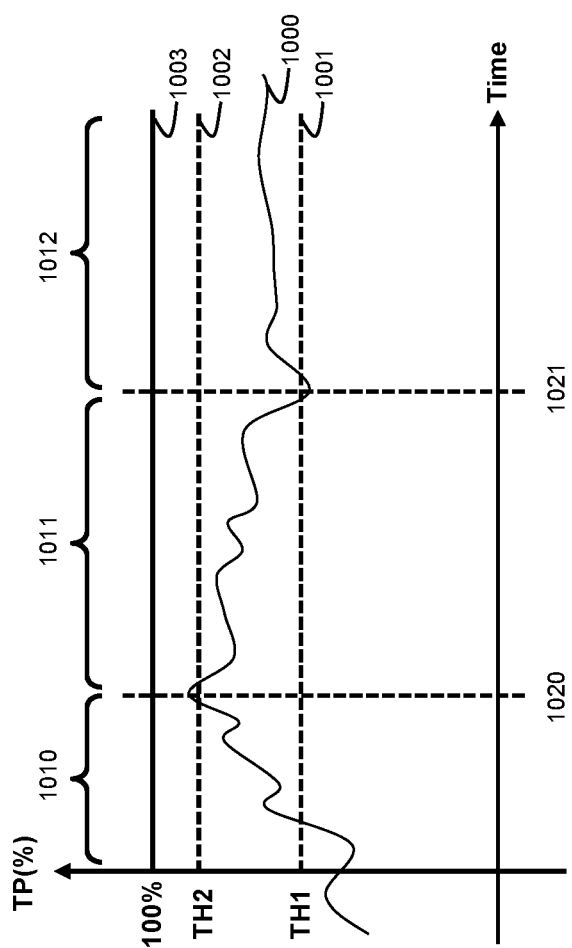
FIG. 10 shows a plot of bandwidth usage of an access network and thresholds for operating a multi-path agent according to an embodiment.

FIG. 10 shows a plot of bandwidth usage 1000 of the first access network 151 expressed as a percentage of the total available bandwidth of the first access network 151. This bandwidth usage 1000 may be communicated as status information to multi-path agent 110. During a first period 1010, the bandwidth usage of the first access network is satisfactory and, hence, the first routing circuitry operates according to the first operation mode. At a certain moment in time 1020 the bandwidth usage exceeds a higher threshold value 1002. Exceeding this threshold is a sign that the capacity of the first access network is not sufficient. Therefore, upon exceeding this threshold 1002, multi-path agent 110 sends the instruction 631 to switch from the first operation mode to the multi-path operation mode. As part of the traffic is now rerouted over the second access network, the bandwidth usage 1000 of the first access network will start decreasing within a second time interval 1011. Then, at a further moment in time 1021, when the bandwidth usage 1000 drops below a lower threshold 1001, i.e. a threshold lower than threshold 1002, multi-path agent 110 switches back from the multi-path operation mode to the first operation mode for the following period 1012. By the two thresholds, an oscillating behavior between the first and multi-path operation mode is avoided.

FIG. 7 illustrates steps performed by the various components 101, 150, 110, 120 when operating according to the multi-path operation mode. According to this mode, routing circuitry 150 is configured to either route 701 a packet 700 as described with reference to FIG. 6 or to forward 711 a packet 710 to the multi-path agent 110. Advantageously, routing circuitry 150 only forwards packets to the multi-path agent 100 when the connection to which the packets belong can be transformed into a multi-path connection. For example, packets according to the following protocols may be forwarded to the multi-path agent 110:

TCP/IP transport protocol;
Quick UDP Internet Connections protocol or, shortly, QUIC, as currently under draft by the IETF;
The CISCO proprietary AnyConnect SSL VPN protocol; and/or
Any other Datagram Transport Layer Security, DTLS, based protocol.

This forwarding is illustrated in step 711 by which the packet 700 is forwarded as packet 712 to the multi-path agent (D-MAC: AGENT). The multi-path agent 110 receives that forwarded packet 712 in step 713 upon which it may perform any of the following actions:

(i) perform a multi-path conversion of the packet 712 and forward the packet according to step 714 to the second routing circuitry 120 for further forwarding to the end node 171 along the second access network 121;
(ii) perform a multi-path conversion of the packet 712 and return the packet back according to step 730 to the first routing circuitry 150 for further forwarding to the end node 171 along the first access network 151;
(iii) do not perform a multi-path conversion and return the packet back according to step 740 to the first routing circuitry 150 for further forwarding to the end node 171 along the first access network 151; and/or
(iv) trigger the client node 101 according to step 753 to fall back to another transport protocol that is supported by the multi-path agent for further conversion according to step 714 or 730 to a multi-path connection.

Figure 7A:
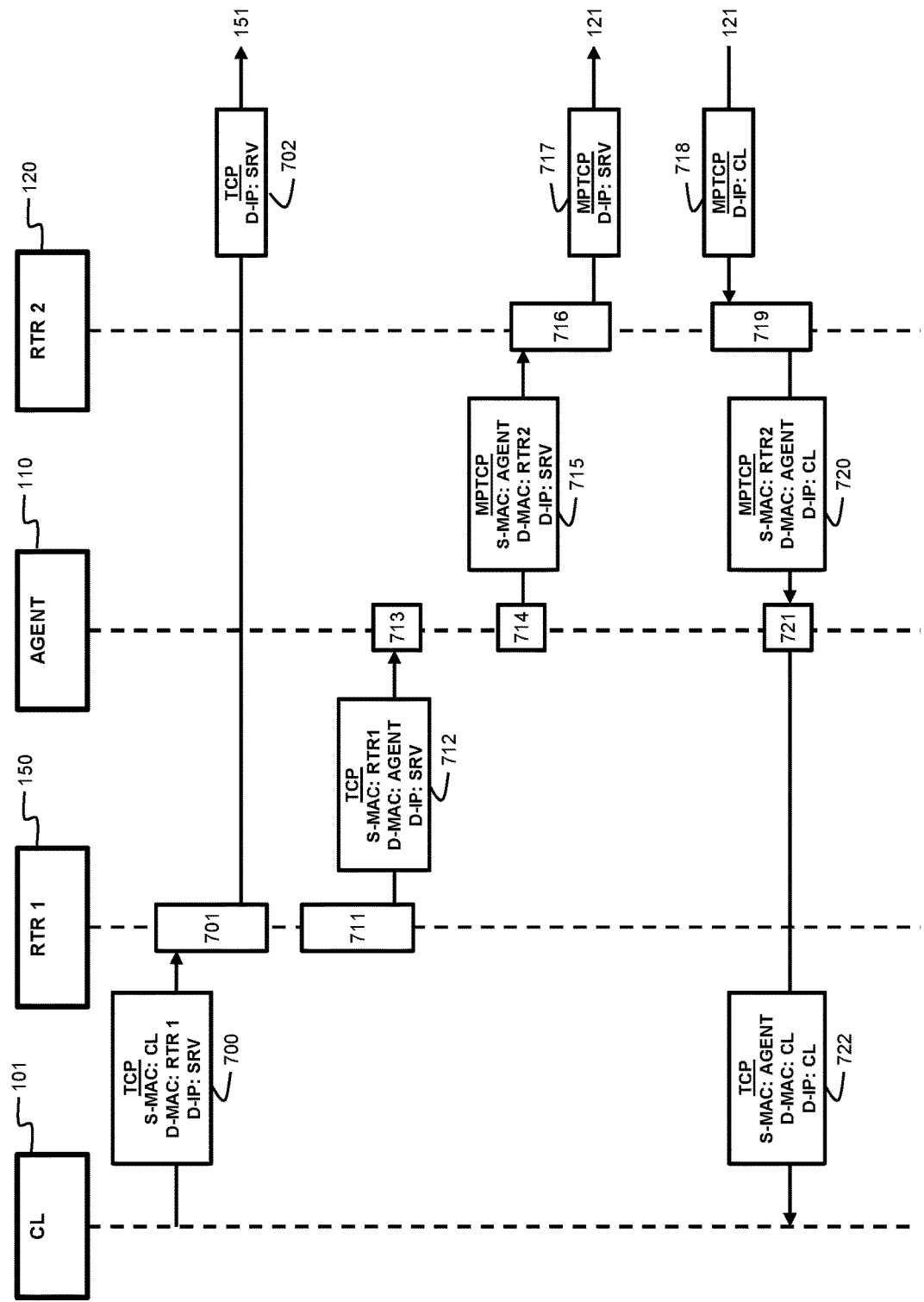

Above action (i) is illustrated in FIG. 7A by step 714. In this step, multi-path agent 110 converts the received packet 712 to a multi-path packet 715. For example, multi-path agent 110 may transform TCP/IP packet 712 to a Multi-Path TCP, MPTCP, packet 715. In step 714, multi-path agent 110 decides to forward the MPTCP packet 715 over the auxiliary subflow, i.e. along the second access network 121. To this respect, multi-path agent 110 forwards MPTCP packet 715 to the second routing circuitry 120 (D-MAC: RTR2). Thereupon, second routing circuitry 120 receives the MPTCP packet 715 under step 716 and routes it, as packet 717, along the second access network 121, for example to a hybrid access gateway 130.

In the analogous downstream case for action (i), routing circuitry 120 receives a multi-path packet 718 from the second access network 121 in step 719. Thereupon, routing circuitry 120 forwards the multi-path packet 720 (D-MAC: AGENT) to the multi-path agent 110. Thereupon, multi-path agent 110 identifies the multi-path packet 720 and converts it back to the original transport protocol, e.g. TCP/IP, in step 721. Thereupon, multi-path agent 110 forwards the packet 722 to client 101 (S-MAC: AGENT, D-MAC: CL).

Figure 7B:
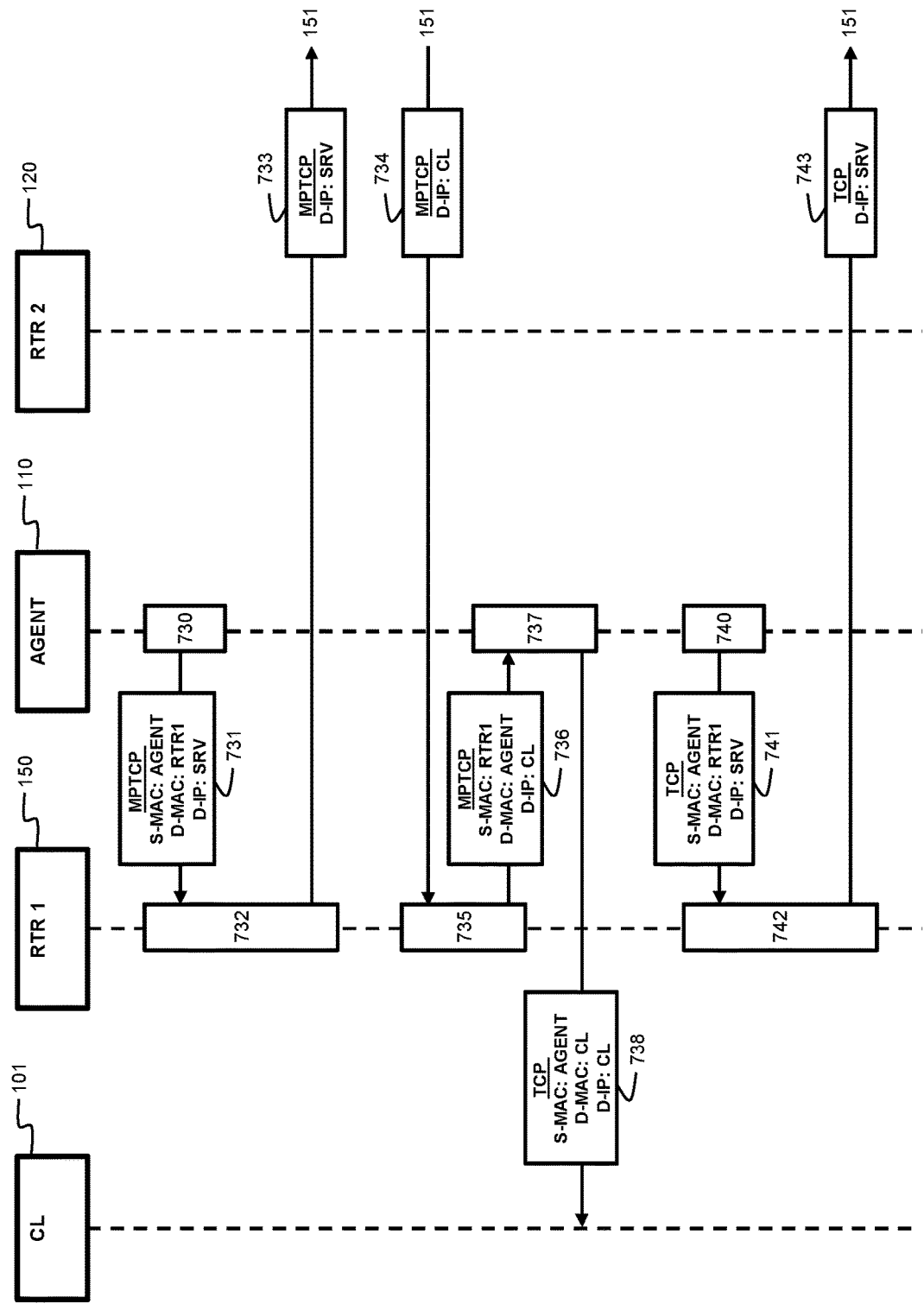

Above action (ii) is illustrated in FIG. 7B by step 730. In this step, multi-path agent 110 converts the received packet 712 to a multi-path packet 731. For example, multi-path agent 110 may transform TCP/IP packet 712 to a Multi-Path TCP, MPTCP, packet 731. In step 730, multi-path agent 110 decides to forward the MPTCP packet 730 over the primary subflow, i.e. along the first access network 151. To this respect, multi-path agent 110 forwards MPTCP packet 731 to the first routing circuitry 150 (D-MAC: RTR1). Thereupon, first routing circuitry 150 receives the MPTCP packet 731 under step 732 and routes it, as packet 733, along the first access network 151, for example to a hybrid access gateway 130.

In the analogous downstream case for action (ii), routing circuitry 150 receives a multi-path packet 734 from the from access network 151 in step 735. Thereupon, routing circuitry 150 forwards the multi-path packet 736 (D-MAC: AGENT) to the multi-path agent 110. Thereupon, multi-path agent 110 identifies the multi-path packet 736 and converts it back to the original transport protocol, e.g. TCP/IP, in step 737. Thereupon, multi-path agent 110 forwards the packet 738 to client 101 (S-MAC: AGENT, D-MAC: CL).

Above action (iii) is illustrated in FIG. 7B by step 740. In this step, multi-path agent 110 decides not to perform any conversion. This decision may be based on a black-list comprising conditions on which no multi-path conversion may be made. Such black-list may for example list source or destination IP addresses for which the conversion may not be performed. Such black-list may also comprise a list of application protocols for which the conversion may not be done. Alternatively, or additionally, multi-path agent 110 may base the decision on a white-list comprising conditions on which multi-path conversion may be performed. Upon deciding not to perform the multi-path conversion, the multi-path 110 returns the packet 741 back to the first routing circuitry 150 for further routing under step 742 as packet 743 along the first access network 151.

Above action (iv) is illustrated in FIG. 7C by step 753. In this step, multi-path agent 110 identifies that the packet 750, forwarded under step 751 by first routing circuit 150 as packet 752, is not a candidate for multi-path conversion, but that the transport protocol supports a fall back mode which is supported by the multi-path agent 110 for multi-protocol conversion. To trigger the fall back, multi-path agent 110 generates a packet 754 and sends it to client 101 upon which the client falls back to the other supported protocol. For example, when packet 752 is a packet according to the QUIC transport protocol, then multi-path agent 110 generates an ICMP packet 754 indicating that the QUIC protocol is blocked such that client 101 falls back to the TCP/IP transport protocol. Thereupon, client 101 resends the packet 752 as packet 755 according to the fall back protocol to the gateway router 150 which forwards, under step 756, the packet 757 to multi-path agent 110. As the packet 757 now supports multi-path conversion, multi-path agent 110 proceeds with the multi-path conversion according to any one of the above described steps 714, 730.

Figure 8:
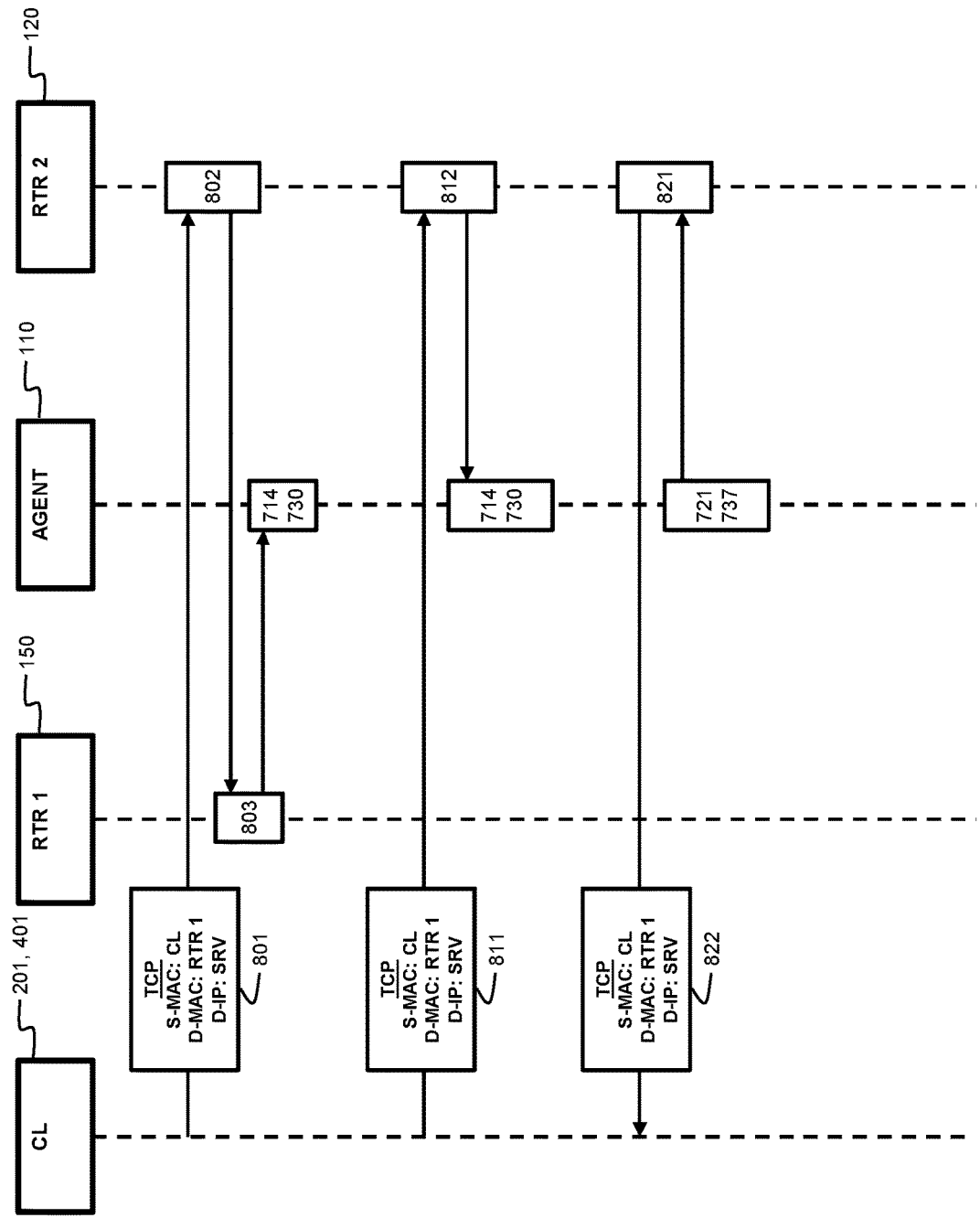
FIG. 8 illustrates steps performed by a first routing circuitry, by a second routing circuitry, by a multi-path agent and by a client connected to the second routing circuitry according to an embodiment.

When the second routing circuitry 120 is directly connected with a further wireless interface 225, 425 as is the case for the second routing gateway 221, 421 shown in respectively FIG. 2 and FIG. 4, a further optimization in the forwarding rules of second routing circuitry 120 may be performed. This further optimization is illustrated in FIG. 8 below. When routing circuitry 150 would be configured as primary gateway router, then a packet 801 received from wireless clients 201, 401 at the wireless interface 225, 425 would be forwarded under step 802 to the first routing circuitry 150. Thereupon, similar to the forwarding rules as in step 711, the packet would be forwarded under step 803 to the multi-path agent 110 for further conversion as already described with reference to steps 714, 730. This sequence of steps may be optimized by a change in the forwarding rules of routing circuitry 120, i.e. by configuring second routing circuitry 120 to forward packets under step 812 to the multi-path agent 110 when the packets are candidates for multi-path conversion, i.e. according to the same rules as under step 711. Thereupon, the multi-path agent may perform the further steps 714, 730 as already described with reference to FIG. 7A. In the downstream path, a similar inverted process may be followed. When the multi-path agent 110 receives a packet under the steps 721, 737 as already described with reference to FIG. 7A and FIG. 7B and determines that the packet is for a client 201, 401 that is wirelessly connected to the second routing circuitry 120, it forwards the packet to the second routing circuitry 120. Thereupon, the second routing circuitry 120 forwards the packet 822 under step 821 to the client 201, 401.

Figure 9:
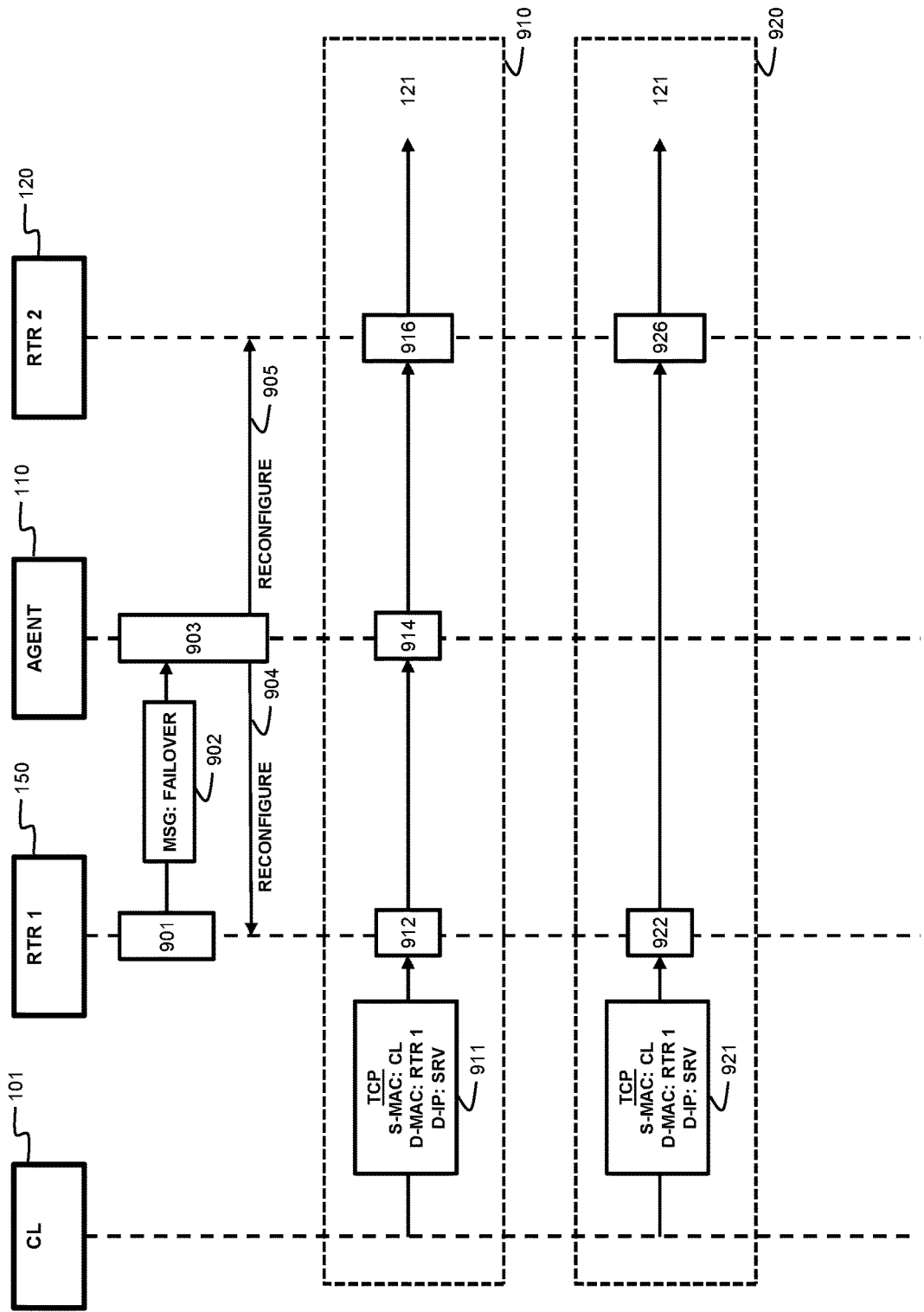
FIG. 9 illustrates steps performed by a first routing circuitry, by a second routing circuitry, by a multi-path agent and by a client connected to the first routing circuitry for performing a failover triggered by a certain condition according to an embodiment of the invention.

FIG. 9 illustrates steps performed by the various components 101, 150, 110, 120 for performing a failover triggered by a certain condition. At a certain moment in time first routing circuitry 150 detects in step 901 a certain condition that triggers the failover, e.g. circuitry 150 detects in step 901 that connection to the first access network 151 has been lost. Upon detecting the condition, the routing circuitry 150 constructs a reporting message 902 and reports the detected condition by the message 902 to the multi-path agent 110. The exchange of such messages 902 may for example be performed over the control channel 621 as illustrated with reference to the FIG. 6. Upon receiving the message 902 by the multi-path agent 110 in step 903, the multi-path agent 110 reconfigures the first and/or second routing circuitry as indicated by arrows 904, 905 to operate according to a failover operation mode 910, 920. According to this failover operation mode, all outside network traffic is redirected to the second routing circuitry 120 for further routing to the second access network 121.

The redirecting may be performed in various ways. A first way is illustrated in FIG. 9 within the dashed rectangle 910. According to this first way, the first routing circuitry 150 is configured to forward, under step 912, outside network traffic, e.g. a packet 911 coming from the client 101, to the multi-path agent 110. Upon receival, under step 914, the multipath agent 110 forwards the packet 911 to the second routing circuitry, which, on its turn, forwards the packet 911 under step 916 towards the packet's destination over the second access network 121.

A second way is illustrated in FIG. 9 within the dashed rectangle 920. According to this second way, the first routing circuitry 150 is configured to forward, under step 922, outside network traffic, e.g. a packet 921 coming from the client 101, directly to the second routing circuitry 120, which, on its turn, forwards the packet 911 under step 926 towards the destination over the second access network 121.

The first way 910 of operation has the advantage that the multi-path agent stays in control of the failover mode at all times. This may for example be useful in situations where the multipath agent has little control over the first and/or second routing circuitries. This may be the case when the multi-path agent is embedded in a separate device 411 as illustrated in FIG. 4 or when it would be embedded in the second gateway router (not shown in a figure). The second way for performing the failover has the advantage that network traffic and network processing is reduced compared to the first way. This second way may be preferable in situations wherein the multi-path agent has control over the first routing circuitry, for example when it is directly embedded in the first gateway router as illustrated in FIG. 2 and FIG. 3.

There may be situations wherein the second access network 121 does not provide direct access to an outside network 170 such as the Internet, for example when the second access network is only used for connecting to a HAG 130 for providing the multi-path network access. In such a case, the multi-path agent 110 may first reconfigure the second routing circuitry 120 to connect to another access network that directly connects to the Internet. Alternatively, the second routing circuitry may offer access to another access network in parallel with the second access network 121. In this case, the multi-path agent may reconfigure the first and/or second routing circuitry to use this other parallel access network. In some cases, such other access network may be made accessible by splitting up the local access network 100 into separate virtual local access networks or VLANs wherein the different access networks of the second routing circuitry are then part of a different VLAN. Upon the reconfiguring in steps 904, 905, the multi-path agent may then reconfigure the local network to redirect the packets 911 onto the VLAN that connects to the other access network.

When the condition that triggered the failover is resolved, the multi-path agent may reconfigure the first and/or second routing circuitry back to their initial operation mode. For example, when the first access network 150 is operable again, the multi-path agent 110 may resume the multi-path operating mode.

As used in this application, the term "circuitry" may refer to one or more or all of the following:
  (a) hardware-only circuit implementations such as implementations in only analog and/or digital circuitry and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
  (c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A computer-implemented method for providing multi-path network access to a client node in a first local area network, the method comprising, by a first routing circuitry that is network addressable:
providing routing of packets between the first local area network and a first access network thereby providing network access to the first local area network;
providing forwarding of packets within the first local area network;
intercepting network packets from the client node destined for a destination node outside the first local area network;
forwarding the intercepted network packets to a multi-path agent that is network addressable within the first network;

the method further comprising, by the multi-path agent:
receiving the intercepted network packets from the first routing circuitry;
transforming the intercepted network packets to multi-path networking packets supporting a multi-path networking protocol; and
forwarding, according to the multi-path networking protocol, the multi-path networking packets to the first routing circuitry for further routing along the first access network and/or to a second routing circuitry that is network addressable for further routing along a second access network;
wherein the second routing circuitry provides network access to the first local area network over the second access network.

2. The method according to claim 1 further comprising:
by the first routing circuitry, sending status information of the first access network to the multi-path agent.

3. The method according to claim 2 further comprising:
by the multi-path agent, performing the forwarding based on the status information of the first access network.

4. The method according to claim 1 further comprising:
before the intercepting, by the first routing circuitry, routing the network packets to the first access network.

5. The method according to claim 4 further comprising:
by the multi-path agent, sending to the first routing circuitry an instruction to start the intercepting.

6. The method according to claim 3 wherein the status information comprises a bandwidth usage of the first access network; and
wherein the sending the instruction by the multi-path agent is performed when the bandwidth usage exceeds a first bandwidth usage threshold; and
wherein the method further comprises, by the multi-path agent, sending to the first routing circuitry an instruction to stop the intercepting when the bandwidth usage drops below a second bandwidth usage threshold; and
wherein the second bandwidth usage threshold is smaller than or equal to the first bandwidth usage threshold.

7. The method according to claim 1 further comprising:
upon detecting a predefined condition, redirecting all outside network traffic from the first routing circuitry to the second routing circuitry for further routing to the second access network.

8. The method according to claim 1 wherein the intercepting further comprises:
inspecting if packets from the client node to the destination node comply with a predefined network protocol type, with a predefined transport protocol type, and/or with a predefined application protocol type; and
when the inspected packets comply, performing the forwarding to the multi-path agent.

9. The method according to claim 1 further comprising, by the multi-path agent:
upon receiving an intercepted network packet according to a protocol that does not allow multi-path transformation by the multi-path agent;
sending a message to the client node for forcing the client to fall back to another protocol that is supported by the multi-path agent for multi-path transformation.

10. The method according to claim 1 further comprising, by the multi-path agent:
deciding to perform the transforming based on a white or black list comprising criteria for respectively allowing or refusing the transforming.

11. The method according to claim 1 further comprising:
by the first and/or second routing circuitry, receiving in return a multi-path networking packet from the respective first and/or second access network, and forwarding, the multi-path networking packet to the multi-path agent;

by the multi-path agent, receiving the forwarded multi-path networking packet, and transforming the multi-path networking packets to a protocol supported by the client, and forwarding the transformed networking packet to the client.

12. A gateway router comprising a routing circuitry that is network addressable configured to perform the following steps:

providing routing, of packets between a first local area network and a first access network thereby providing network access to the first local area network;

providing forwarding of packets within the first local area network;

intercepting network packets from a client node destined for a destination node outside the first local area network;

forwarding the intercepted network packets to a multi-path agent that is network addressable within the first network;

receiving from the multi-path agent a selection of the intercepted network packets transformed according to a multi-path networking protocol;

forwarding the transformed network packets to the destination node over the first access network.

13. The gateway router according to claim 12 further comprising multi-path circuitry configured to perform the following steps:

receiving the intercepted network packets from the first routing circuitry;

transforming the intercepted network packets to multi-path networking packets according to the multi-path networking protocol; and forwarding, according to the multi-path networking protocol, the multi-path networking packets to the first routing circuitry for further routing along the first access network and/or to a second routing circuitry that is network addressable for further routing along a second access network;

wherein the second routing circuitry provides network access to the first local area network over the second access network.

14. The gateway router according to claim 13 further comprising the second routing circuitry.

15. A networking device comprising a communication interface and multipath circuitry that is network addressable configured to perform the following steps:

receiving intercepted network packets from a gateway router;

transforming the intercepted network packets to multi-path networking packets according to a multi-path networking protocol; and forwarding, according to the multi-path networking protocol, the multi-path networking packets to the gateway router for further routing along the first access network and/or to a second routing circuitry that is network addressable for further routing along a second access network;

wherein the second routing circuitry provides network access to the first local area network over a second access network.

16. The networking device according to claim 15 wherein the communication interface is a wireless communication interface connectable to the gateway router by a wireless local area network; and wherein the networking device further comprises the second routing circuitry and a second wireless communication interface for providing the networking device network access to the second access network; and wherein the networking device is further configured to establish a networking tunnel between the multipath circuitry and the gateway for exchanging the networking packets with the gateway router.

* * * * *